United States Patent
Fletcher et al.

[15] 3,706,583
[45] Dec. 19, 1972

[54] THERMAL SHOCK RESISTANT HAFNIA CERAMIC MATERIAL

[72] Inventors: James C. Fletcher, Administrator of the National Aeronautics and Space Administration with respect to an invention of; Lynn D. Lineback, 2612-B Noble Road; Charles R. Manning, 4812 Connell Drive, both of Raleigh, N.C.

[22] Filed: Oct. 14, 1971

[21] Appl. No.: 189,375

[52] U.S. Cl. .............. 106/39 R, 106/55, 106/58, 106/63, 264/65, 264/DIG. 36
[51] Int. Cl. .............................................. C04b 35/00
[58] Field of Search .............. 29/182.5; 75/206, 226; 106/39 R; 264/65, DIG. 36; 106/55, 58, 63

[56] References Cited

UNITED STATES PATENTS

| | | | |
|---|---|---|---|
| 3,615,756 | 10/1971 | Jorgensen | 264/65 X |
| 3,526,485 | 9/1970 | Dawihl et al. | 75/206 X |
| 3,412,194 | 11/1968 | Pipitz et al. | 13/6 |
| 3,369,877 | 2/1968 | Humenik et al. | 29/182.5 |
| 2,855,491 | 10/1958 | Navias | 29/182.5 X |
| 2,767,467 | 10/1956 | Tacvorian | 29/182.5 |

OTHER PUBLICATIONS

Manning et al. High–Temperature Cermets, In J. Amer. Cer. Soc. 51(8): p. 411–419, August 21, 1968. TP785. A62

*Primary Examiner*—Carl D. Quarforth
*Assistant Examiner*—R. E. Schafer
*Attorney*—John R. Manning et al.

[57] ABSTRACT

Ceramic hafnia artefacts having high thermal shock resistance are provided by incorporating tungsten or molybdenum particles in a yttria-, magnesia-, or calcia-stabilized hafnia matrix. The mix is sintered by hot pressing to form the ceramic article which has a high fracture strength relative to its elastic modulus and thus has an improved thermal shock resistance. The hafnia is preferably stabilized to about 50 percent and the tungsten or molybdenum particles are preferably elongate, having a length/thickness ratio of at least 2/1. Tungsten or molybdenum wire pieces are suitable.

18 Claims, No Drawings

THERMAL SHOCK RESISTANT HAFNIA CERAMIC MATERIAL

The invention described herein was made in the performance of work under a NASA contract and is subject to the provisions of Section 305 of the National Aeronautics and Space Act of 1958, Public Law 85-568 (72 STAT. 435; 42 U.S.C. 2457).

BACKGROUND OF THE INVENTION

This invention relates to ceramic articles and to methods of making same. More particularly, the invention relates to ceramic hafnia articles and to methods of making same.

There has long been a need for refractory materials capable of use in high temperature environments. Most recently, refractory materials have been developed for space applications. Typically, materials have been developed for throat areas of solid propellant rocket nozzles. These throat areas are subject, not only to high temperature, but to severe thermal shock, to mechanical erosion, and to chemical erosion. Materials developed in the past for this application include graphite, tungsten, and alumina. However, each of these materials lacks resistance to one or more of the above areas of degradation. Graphite, while having excellent thermal shock resistance, has poor chemical and mechanical erosion resistance. Tungsten is heavy, hard to fabricate, and has poor chemical erosion resistance. Alumina, on the other hand, has poor thermal shock resistance.

It is an object of the present invention to provide a ceramic article having high thermal shock resistance. It is a further object to produce such an article having good mechanical and chemical corrosion resistance. It is still a further object to provide such an article including hafnia.

BRIEF SUMMARY OF THE INVENTION

The foregoing and other objects which will be apparent to those of ordinary skill in the art are achieved according to the present invention by providing a ceramic artefact comprising a yttria- magnesia- or calcia-stabilized hafnia matrix and from 2 to 30 percent by weight, based on the weight of the article, of tungsten or molybdenum particles distributed throughout said matrix. The article is made by providing a mixture of particles of yttria- magnesia- or calcia-stabilized hafnia and from 2 to 30 percent by weight of tungsten or molybdenum particles, and hot pressing the mixture at a sintering temperature and pressure sufficient to produce an article of at least 70 percent of theoretical density.

DETAILED DESCRIPTION

There follows a detailed description of a preferred embodiment of the invention. However, it is to be understood that the detailed description is provided solely for the purpose of illustrating a preferred embodiment and that the invention is capable of numerous modifications and variations apparent to those skilled in the art without departing from the spirit and scope of the invention.

EXAMPLES 1-9

Hafnia specimens are fabricated by a vacuum hot pressing technique. Cylindrical specimens varying in diameter from 1 inch to one-half inch and height from 1 inch to one-fourth of an inch are formed by induction heating in conventional graphite dies. The temperature is maintained at or near 2,100 °C. in a vacuum of less than 10 microns of mercury. Pressures up to 10,000 pounds per square inch are applied during hot pressing.

The tapered graphite dies are machined from Basic Carbon's Graphatite A for pressures to four thousand pounds per square inch and Poco Graphite HP-1 for pressure above those. All rams are fabricated from Poco Graphite HP-1 graphite. Tantalum end shields are placed between the ram and specimens to facilitate removal of specimens and to retard carbon diffusion into the specimens.

Pressure is applied by a conventional hydraulic press through a bellows assembly into a vacuum body which is evacuated by a 6 inch diffusion pump backed by a 150 standard cubic foot per minute mechanical pump. The die is located inside a graphite and silica cloth lined induction coil within the vacuum body. The temperature of the outside surface of the die is read by optical pyrometer through a series of sight ports through the vacuum body, coil, and insulation. Die displacement readings for determination of densification termination is measured by a variable differential transducer and the output is read on a strip chart recorder.

The hafnia utilized in these examples is minus 325 mesh (Tyler) particle size, of reactor grade quality and in the low temperature monoclinic crystallographic form and sufficiently pure such that no high temperature body centered tetragonal form is retained upon heating above the transformation temperature and subsequent quenching without the addition of a stabilizer such as yttria, magnesia, or calcia. The hafnia is stabilized with yttria, magnesia or calcia according to the invention in the conventional manner. The yttria utilized in these examples is minus 325 mesh in particle size and of reactor grade quality.

Solid solutions of hafnia and yttria are obtained during vacuum hot pressing. At a temperature of 2,100°C. the solid solution is obtained before densification is completed such that both operations can be performed simultaneously.

The degree of stabilization is established by an x-ray technique following Buckley, J.D., "Stabilization of the phase transformations in hafnium oxide", Unpublished Ph.D. thesis, Department of Ceramic Engineering, Iowa State University, Ames, Iowa, (1967) and Duwez, P. and Odell, F., "Quantitative analysis of cubic and monoclinic zirconia by x-ray diffraction", J. Am. Cer. Soc., 32(5):130 (1959). This method involves measuring the relative intensities of the (111) and (11$\bar{1}$) monoclinic lines and the (111) body centered tetragonal line. The ratios of the three possible combinations give directly from tabulated data the degree of stabilization in terms of the percentage of tetragonal phase present. In general, the degree of stabilization is determined on the end surfaces of specimens which subsequently are exposed to the various tests.

Density determinations are by ASTM Designation B 311-58 entitled "Standard Method of Test for Density of Cemented Carbides" with no modifications. This technique is the immersion technique and distilled water is the immersion fluid used.

Specimens having a diameter of one-half inch and a height of one-fourth inch are used to determine the modulus of elasticity and compressive fracture strength. The small height to diameter ratio is employed to reduce the effect of barreling on strain measurements obtained from SR-4 strain gauges cemented to each specimen.

Specimens are loaded in compression with a conventional tensile-compressive testing machine. Strain is measured at intervals of 250 pounds static load between one thousand and three thousand pounds load. Strain in micro inches per inch is read from 120 ohm gauges having a gauge factor of 2.05 by use of a balanced bridge potentiometer. Polyester films are placed between the specimens ends and the compression rams to reduce sliding friction on the self aligning heads. Loading is cycled a minimum of three times to achieve reproducibility of strain readings. The values of stress are plotted against strain to assure linearity. Compressive fracture stress is given as that stress at which the first crack is observed to cause a discontinuity in the load.

Specimens are tested for thermal shock resistance by exposing them to nitrogen plasma generated by non-transfered arc at a temperature of approximately 9,000° C. for a period of 5 seconds and subsequently allowing them to cool slowly in static air. The specimens, nominally one-half inch in diameter and three-eights inch in height, are heated from one end by the plasma stream emerging with a diameter of one-fourth of an inch and a flow rate of ninety to one hundred and ten standard cubic feet per hour. The criteria for failure is either total disintegration of the specimen or the presence of one or more macroscopic cracks traversing a portion or all of the specimen. The specimens are not thermally cycled.

Initially, base materials of the high density (98 percent of theoretical) and low density (86 percent of theoretical) are exposed to the described thermal stress environment. Of these materials, those stabilized to about fifty percent exhibit the best thermal shock resistance. Deviations in stabilization in excess of about ten percent or lower yield central compressive stress cracking which originates from the heated surface. Larger deviations also result in ring shear stress cracking. The cracking is more pronounced in the higher density specimens.

The tungsten added to the hafnia is tungsten wire, 0.005 inches in diameter, cut to a length of about one-eighth inch. The tungsten particles are mechanically mixed with the hafnia particles using a conventional mixer.

As shown in the following table, thermal shock resistance, indicated by the ratio of compressive fracture stress to modulus of elasticity, is increased with the addition of tungsten. In addition, no specimen tested containing tungsten exhibited the ring shear stress cracks and only specimens containing amounts of tungsten greater than twenty five weight percent tungsten had any compressive stress cracks. No specimen containing 10 to 20 weight percent tungsten was cracked by thermal exposure.

| Example No. | Wt. % tungsten | Ratio of Compressive Fracture Stress of Modulus of Elasticity |
|---|---|---|
| 1 | 0 | $1.8 \times 10^{-3}$ |
| 2 | 2 | $3 \times 10^{-3}$ |
| 3 | 5 | $4 \times 10^{-3}$ |
| 4 | 8 | $12 \times 10^{-3}$ |
| 5 | 10 | $11.5 \times 10^{-3}$ |
| 6 | 20 | $5 \times 10^{-3}$ |
| 7 | 24 | $4 \times 10^{-}$ |
| 8 | 30 | $3 \times 10^{-}$ |
| 9 | 40 | $2.5 \times 10^{-3}$ |

In view of the foregoing results, it is preferred to use from about 2 to about 30 percent by weight of tungsten to a achieve a substantial increase in the ratio of compressive fracture stress to modulus of elasticity to substantially improve thermal shock resistance. Still more preferably, tungsten is used in an amount of from about 5 percent to about 24 percent by weight. Still more preferably, it is used in an amount of from about 10 percent to about 20 percent by weight.

Similar results are obtained with molybdenum metal, in substantially the same quantity.

The yttria is preferably stabilized to an amount of from 40 to 100 percent, still more preferably from 40 to 60 percent, and to an optimum value of 50 percent to maximize thermal shock resistance. Yttria, magnesia or calcia may be used.

Thermal shock resistance is also related to density, lower density articles having greater shock resistance. In general, the density will be at least 70 percent of theoretical for most applications, with densities of about 88 percent being generally preferred.

The tungsten or molybdenum particles are preferably elongate, having a length/thickness ratio of at least about 2/1. The size of the particles can vary widely and is generally chosen for ease of blending uniformly with the hafnia particles. In general, the thickness of the pieces will be up to about 0.05 inches. The length/thickness ratio will generally be up to about 100/1, and will be somewhat related to thickness. Wire pieces are preferred and wire having a diameter of up to 0.05 inches and a length/diameter ratio of 5/1 to 100/1 are preferred.

The hot pressing process of making the article is conventional and conventional temperatures and pressures for the hot pressing of ceramic hafnia artefacts are employed. In general, the temperature is at least about 1,800°C, and a temperature of about 2,100°C is preferred. Conventional pressures required to achieve desired density are employed, typical pressures being from 2,000 to 10,000 psi.

The particle size of the hafnia is conventional and is preferably at least minus 100 mesh, more preferably minus 200 mesh and even more preferably 300 mesh for most applications, particularly where high density is desired.

Other factors such as the coefficient of thermal expansion, thermal conductivity, and Poisson ratio also affect thermal shock resistance. However, these are either affected favorably or only slightly unfavorably by the present invention. The major effect is a change in the ratio of compressive fracture stress to modulus of elasticity which increases thermal shock resistance.

It has been found that the addition to the article of graphite, which alone has excellent thermal shock resistance, decreases thermal shock resistance. It is therefore preferred to exclude graphite from the article.

What is claimed is:

1. A ceramic artefact comprising a yttria- magnesia- or calcia-stabilized hafnia matrix and from 2 to 30 percent by weight, based on the weight of the article, of particles of a metal selected from the group consisting of tungsten and molybdenum distributed throughout said matrix.

2. A ceramic artefact according to claim 1 wherein the metal is tungsten and the amount of tungsten is from 5 to 24 weight percent.

3. A ceramic artefact according to claim 1 wherein the metal is tungsten and the amount of tungsten is from 10 to 20 weight percent.

4. A ceramic artefact according to claim 1 wherein the hafnia is stabilized to a value of from about 40 percent to 100 percent.

5. A ceramic artefact according to claim 4 wherein the hafnia is stabilized to a value of from about 40 percent to about 60 percent.

6. A ceramic artefact according to claim 5 wherein the hafnia is stabilized to a value of about 50 percent.

7. A ceramic artefact according to claim 1 having a theoretical density of at least 70 percent.

8. A ceramic artefact according to claim 1 wherein said metal particles are elongate pieces having a thickness of up to about 0.05 inches and a length/thickness ratio of at least 2/1.

9. A ceramic artefact according to claim 8 wherein the metal is tungsten and said pieces are wire pieces having a diameter/length ratio of at least 5/1.

10. A ceramic artefact according to claim 1 having a density at least 70 percent of theoretical.

11. A ceramic artefact according to claim 1 wherein: the hafnia is stabilized to a value of from about 40 to 60 percent; said artefact has a theoretical density of at least 70 percent; said particles are elongate tungsten wire pieces having a length/diameter ratio of at least 5/1; and tungsten is present in an amount of from about 3 percent to about 12 percent by weight.

12. A method of making a ceramic article having high resistance to thermal shock comprising the steps of providing a mixture of particles of yttria- magnesia- or calcia-stabilized hafnia and from 2 to o 30 percent by weight of tungsten of a metal selected from the group consisting of tungsten and molybdenum, and hot pressing the mixture at a sintering temperature and at a pressure sufficient to produce an article of at least 70 percent of theoretical density.

13. A method according to claim 12 wherein the mixture is hot pressed at a temperature of at least 1,800°C.

14. A method according to claim 13 wherein the mixture is hot pressed at a pressure of at least 2,000 psi.

15. A method according to claim 12 wherein the hafnia particles have a particle size of less than 100 mesh.

16. A method according to claim 15 wherein the hafnia is stabilized to a value of from about 40 percent to 100 percent.

17. A method according to claim 15 wherein the metal is tungsten and said tungsten particles are elongate pieces having a thickness of up to about 0.05 inches and a length/thickness ratio of at least 2/1.

18. A method according to claim 17 wherein said pieces are wire pieces having a length/diameter ratio of at least 5/1.

* * * * *